(12) United States Patent
Gnanasekaran

(10) Patent No.: US 11,750,712 B2
(45) Date of Patent: Sep. 5, 2023

(54) AUTOMATED PRESENTATION OF ENTERTAINING CONTENT DURING DETECTED WAIT TIMES

(71) Applicant: PAYPAL, INC., San Jose, CA (US)

(72) Inventor: Venkatesh Gnanasekaran, Cupertino, CA (US)

(73) Assignee: PAYPAL, INC., San Jose, CA (US)

( * ) Notice: Subject to any disclaimer, the term of this patent is extended or adjusted under 35 U.S.C. 154(b) by 192 days.

(21) Appl. No.: 17/307,853

(22) Filed: May 4, 2021

(65) Prior Publication Data

US 2022/0360637 A1 Nov. 10, 2022

(51) Int. Cl.
*H04L 67/50* (2022.01)
*G06F 11/34* (2006.01)
*G06V 40/16* (2022.01)
*H04L 67/025* (2022.01)

(52) U.S. Cl.
CPC ........ *H04L 67/535* (2022.05); *G06F 11/3438* (2013.01); *G06V 40/176* (2022.01); *H04L 67/025* (2013.01)

(58) Field of Classification Search
None
See application file for complete search history.

(56) References Cited

U.S. PATENT DOCUMENTS

| | | | |
|---|---|---|---|
| 10,706,118 B1 * | 7/2020 | Yang | H04N 21/4667 |
| 2008/0098420 A1 * | 4/2008 | Khivesara | G06Q 30/02 |
| | | | 725/32 |
| 2015/0310494 A1 * | 10/2015 | Goldberg | G06Q 30/0276 |
| | | | 705/14.64 |
| 2019/0197789 A1 * | 6/2019 | Macauley | G06T 19/006 |
| 2019/0200051 A1 * | 6/2019 | Paul | H04N 21/4788 |
| 2019/0342592 A1 * | 11/2019 | Lewis | H04N 21/44016 |

OTHER PUBLICATIONS

Yu et al., "Incorporating video in platform-independent video games using open-source software", Jul. 1, 2010, IEEE, 2010 3rd International Conference on Computer Science and Information Technology (vol. 9, pp. 466-470) (Year: 2010).*
Sekhavat et al., "Play With One's Feelings: A Study on Emotion Awareness for Player Experience", Jun. 18, 2020, IEEE, IEEE Transactions on Games (vol. 14, Issue: 1, pp. 3-12) (Year: 2020).*

* cited by examiner

*Primary Examiner* — Davoud A Zand
(74) *Attorney, Agent, or Firm* — Haynes and Boone, LLP

(57) ABSTRACT

There are provided systems and methods for automated presentation of entertaining content during detected wait times. A user may utilize a computing device to interact with online service providers. During interactions, events may occur that cause data loading, such as during streaming, requesting data processing, uploading or downloading content, or the like. A service provider may monitor these interactions to determine whether the data loading event causes a wait time. If so, the service provider may monitor the user and the user's device during the wait time to determine activities and interactions occurring during this wait time. A processing engine, such as a rules engine and/or machine learning engine, may utilize the monitored data to detect if the monitored data exceeds a threshold to determine the user is reacting negatively to the wait time. If so, the service provider may automate content delivery on the user's device.

20 Claims, 7 Drawing Sheets

AUTOMATED PRESENTATION OF ENTERTAINING CONTENT DURING DETECTED WAIT TIMES

TECHNICAL FIELD

The present application generally relates to detecting data loading events on computing devices and more particularly to automatically presenting entertaining content during data load times based on detected user interactions and activity.

BACKGROUND

Users may utilize online service providers for various data loading events, such as when downloading data, streaming media, or requesting data processing. These data loading events can take time ranging from a few seconds or minutes to substantially longer. Some events may occur at physical locations separate from a user's home or work where they may engage in other activities while data is loading. However, when these events are slow, or the user cannot perform other events, the user may be inconvenienced and have a negative experience with the service provider. Thus, these events cause friction and may cause frustrating experiences for a user. For example, when using online transaction processors for processing transactions through device applications and digital accounts, checkout times may be slow especially when high data processing queues and requests occur. Thus, it is desirable to detect when data loading events occur, and device or user data indicates a dissatisfaction with the service provider in order to remedy the issues caused by slow processing times from computing resources.

Figure 1:
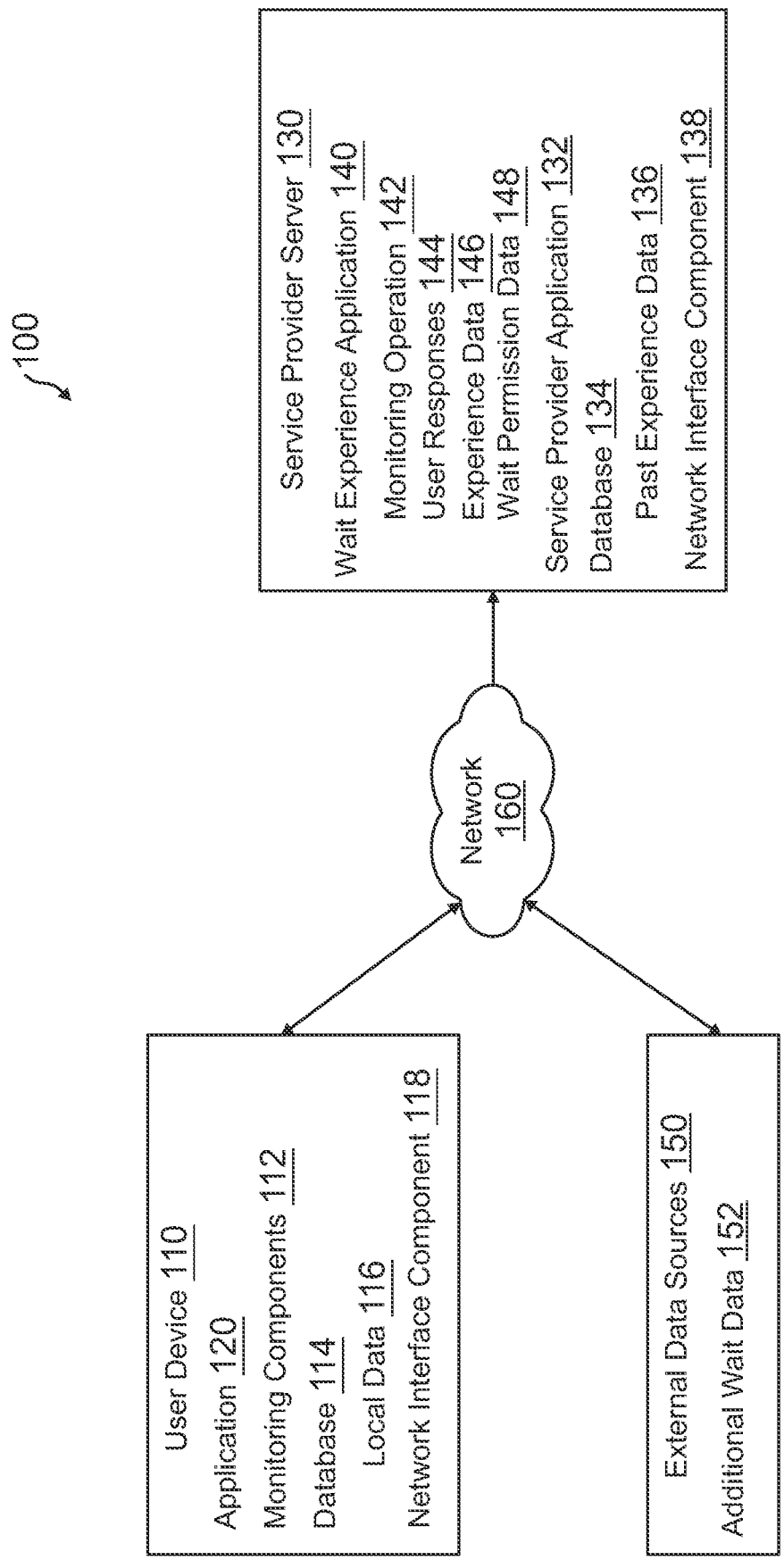
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for automated presentation of entertaining content during detected wait times. Systems suitable for practicing methods of the present disclosure are also provided.

A user may utilize an online service provider to perform various data processing including uploading and/or downloading of data, streaming media content, and/or otherwise interacting with computing devices and available computing services. For example, an online transaction processor (e.g., PAYPAL®, VENMO®, etc.) may provide electronic transaction processing services to users on one or more applications or websites. However, use of these services may include wait times, such as while data is loading, or another computing operation is processing data. To reduce friction and improve a user's experience with the service provider, the service provider may provide automated content delivery during these wait times on the user's computing device. The service provider may utilize device plugins, applications, components, and/or signaling to detect a wait time for an event. For example, the service provider may detect data loading events on a computing device when the user is waiting for data to load within an application or on a website within a web browser.

Thereafter, the service provider may utilize additional device components to determine whether the wait event causes a negative or poor user experience of the user while waiting for the event to complete. This may be done by monitoring device and user interactions. For example, a device interaction may be keyboard and/or mouse interactions, touch screen inputs, video or microphone input, and the like. User responses to the wait time may be determined from monitoring this data, as well as further monitoring the user using device components (e.g., ambient noises and user voice data, video data of the user's face and/or body, biometrics including a heartbeat, etc.). The service provider may utilize one or more rules or models, including artificial intelligence (AI) and/or machine learning (ML) models trained to detect characteristics of a negative experience, such as using training data of observed user and device interactions during wait times that are associated with a good and/or bad response to the wait time. If the service provider detects a bad or negative user experience, the service provider may then automate content output on the computing device to improve the user experience and/or provide relevant data during the wait time and/or event.

In this regard, the transaction processor may provide a browser tool, add-on, extension, or the like, as well as a resident dedicated application (e.g., mobile application), that may monitor device and/or user activities and interactions during data loading and other events. For example, a user may wish to process a purchase of one or more items in a transaction. Selection of one or more items during an online transaction with a merchant website may require a payment instrument from the user for electronic transaction processing. A user may pay for one or more transactions using a digital wallet or other account with an online service provider or transaction processor (e.g., PayPal®), as well as the payment card (e.g., through proffering the physical card and reading card data or by entering card details and/or account numbers). An account and/or corresponding payment card with a service provider may be established by providing account details during setup. All these services for account creation, login, account access and use, and electronic transaction processing may cause wait times. Further, other types of service providers may cause users to experience wait times while loading data, waiting for data processing, and/or waiting for provision of a service.

Thus, the user may engage in one or more online or virtual interactions, such as browsing websites and loading data available with websites. The service provider may monitor and track when these wait times occur using an application plugin, an application extension, or an application add-on, as well as mobile applications and other resident device applications, provided by a digital platform associated with the service provider. To detect wait times, the service provider may detect and/or monitor device and user activity and interactions with each other and internal/external computing resources (e.g., webpages, data resources, applications, etc.). For example, the service provider may detect if a data loading event is occurring through network signaling, network socket activity, and other network data transfers, such as uploading/downloading of data, processing data, and the like. The service provider may also detect if a timer, loading wheel or bar, or another interface element is displayed that is associated with loading data. Additionally, the service provider may use historical data, such as recent load times of data by other users with an application or webpage, to determine if the user will experience a wait time.

When it is detected that the user is experiencing a wait time, the service provider may utilize one or more device components and/or operations to capture data of the user's movements, actions, and/or interactions during the wait time. In some embodiments, the wait time may be required to exceed a threshold wait time (e.g., one minute, five minutes, etc.), in order to monitor a user. When a wait time is detected, the service provider may capture image, video, audio, audiovisual content, biometrics, movements, and the other activity of the user. This may include data such as breathing patterns, heart rate, facial expressions, eye movements and/or eye focus on a screen, hand or finger movements, leg or foot movements including tapping, and the like. The service provider may also capture interactions of the user with the device, including socket layer activity, mouse or keyboard clicks and input, mouse focus changes, mouse movements, switching between applications or webpages, and the like. Based on this data, the service provider may determine whether the user is having a negative experience during the wait time. For example, one or more models and/or rules may be used to determine if the user is having a positive or negative experience during the wait time. If a threshold score, rule, or classification is not met to determine that the user is having a negative experience, or if the user is not detected (e.g., they have left their computing device during the wait time), it may be assumed the user is having a positive and/or neutral experience and automated content may not be presented to the user.

However, during certain wait times and events, the user may be detected as having a negative user experience. This may occur when the captured data of the user's actions, activity, and/or interactions during the wait time is sufficient to indicate the user is having the negative experience. A rule-based engine may include one or more data processing rules that determine a number of indicators in the device and/or user data during the wait time. For example, if the user's eye movement, eyebrows, or forehead (e.g., furrowed brow) are present, the user may be having a negative experience with the wait time and corresponding event. In other embodiments, multiple factors may be required to be present. In some embodiments, an AI system, such as an ML engine having one or more trained ML models, may be used to process the attributes of the user's data as input and provide a corresponding output. The ML models may be trained using training data of user's activity and interactions during a wait time and a corresponding classification of those attributes as a positive, neutral, negative, or the like. Thus, a system for classifying the user's activity and/or interactions during a wait time may be performed using one or more rule-based and/or AI systems.

If a user is having a negative experience, the service provider may determine to output content to the user. When outputting content to the user, the service provider may utilize different communication channels, applications, and/or software components. For example, a web browser may be setup with a plugin, add-on, or extension for the service provider that allows for the service provider to perform the monitoring of the user and/or device activity and interactions. This extension may therefore allow for the service provider to perform detection of the event having a wait time and if the user is having a negative experience during the wait time. Thereafter, the extension may further be used to deliver one or more of the contents discussed herein. The extension may allow for a user interface to be displayed, such as a window with a webpage, that includes the content. This may include third-party windows and interfaces for content retrieved from other sources and output with a displayed webpage or user interface. Similarly, a rich Internet application and/or resident dedicated software application on the user's computing device may similarly allow the service provider to perform these operations. For example, the service provider may provide the application, which may include the same or similar operations to monitor activity and interactions, and thereafter present content through one or more user interfaces.

In other embodiments, monitoring user and device activity and interactions, as well as presentation of content, may occur through signal detection from a website and/or computing device, such as from the sources where signaling from the website and/or computing device may be detected. For example, by monitoring signals from a device and/or a server for a website, such as via one or more network sockets that serve as an endpoint for data communications, the service provider may also detect wait times and negative user experiences from data sources. Further, monitoring network sockets may allow for determining where the bottleneck is during data loading (e.g., the device or server), which allows for determining whether local device content on the device or other online content is provided to the user during the wait time. This may then allow for data presentation to the user through another application or website, as well as by utilizing application programming interface (API) integrations with proxy servers and device/web applications for content presentation. In this regard, with API integrations, a proxy server may be used to intercept user interactions and other data necessary for determination of a negative user experience, as well as output data through user interfaces of applications and websites.

When determining content to present to a user during a wait time, the service provider may utilize a user profile and/or one or more preferences of the user for content presentation during the wait time to alleviate the negative user experience during data loading or another event. In this regard, by automating content presentation and output, the issues with data loading and the like from online service providers may be resolved. This allows for customizing webpage and/or application content and data output to a user. For example, a webpage level and/or application level customization to output data to a user may be performed through the application extension, the application directly, and/or through API integrations. The profile may be used to determine interests of the user, which may include news stories, sports, local news/sports of interest, movies and/or television shows, music, other media content, social networking, image sharing, video games (e.g., either online games or local game applications), and the like. In some embodiments, the information may also be about the particular service provider, such as by providing information about services and products of the service provider. In this regard, a particular service may be currently in-use during the data loading, and additional information about the service (e.g., features, benefits, instructions, etc.) may be output to the user.

In order to reduce bandwidth usage and/or slowing of the data loading causing the wait time, a separate communication channel may be used to deliver the content. Further, local servers (e.g., servers within a set distance or proximity of the user's computing device) may be used to fetch the data for presentation. These local servers may also be selected based on load or processing times to provide the content, such as ones that are experiencing fast load times when outputting the content to the user. The local server may also be selected based on a proximity distance to the user's computing device to reduce data transmission speeds and bandwidth usage with proxy or relay servers. In some embodiments, if a profile does not exist for the user, the content may be determined based on demographic of the user, a social networking or media account, a browser history, online posts or microblogging account, and the like.

In some embodiments, the data may be more generic or less personalized data, which may be displayed statically or dynamically on the computing device of the user. For example, local data in local storage on the computing device, such as images, a music or media (e.g., television, movies, etc.) playlist or stored data, local video games, and the like, may be presented to the user. However, the data may still be presented dynamically, such as through a personalized slideshow or film roll of images based on a location, time, or dates of the images and/or the user. This may also include a media playlist specifically configured for a time of day, location, setting (e.g., work, with friends, eating at a restaurant, airport security, etc.), or the like of the user. Streaming data may also be presented to the user, such as using music or media content from a streaming service provider. When the wait time is ended, the automated content delivery may automatically end, and the user may return to the website or application interface that was processing data and has now loaded the data or otherwise advanced processing. However, the user may also be prompted of whether the user would like to end the content presentation or continue viewing.

In another aspect, the user may experience wait time beyond data loading, such as when boarding a transportation provider (e.g., while in line at an airport for a flight). The operations of the browser extension and/or application may monitor data associated with the user waiting in a physical line or other real-world event not directly associated with data loading or processing on the user computing device. Examples include waiting in a line for entrance to an event or vehicle, ordering an item and waiting for checkout and/or preparation, and the like. The user may be detected as waiting from application data indicating a wait time (e.g., a boarding time for a transportation provider, a wait time for an order to be prepared, and the like). This may also include capturing physical information of the user, such as if the user is sitting, standing next to other users, detected at a merchant location or transaction provider location (e.g., airport, bus stop, taxi line, etc.), or may be determined using calendar data of the user, such as showing the user attending an event that may require waiting in a line. Similar to the above, if the wait time exceeds a certain threshold and the user is determined to be having a negative experience during the wait time, specific content may be determined and provided to the user during the wait time. When the wait ends, such as if the user boards a transportation provider, enters an event, or completes an in-person payment or checkout, the content may similarly either automatically end or the user may be prompted if the user wishes to end content presentation or continue.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers, may be combined or separated for a given embodiment and may be performed by a greater number or fewer number of devices and/or servers. One or more devices and/or servers may be operated and/or maintained by the same or different entities.

System 100 includes a user device 110, a service provider server 130, and external data sources 150 in communication over a network 160. User device 110 may be used to interact with one or more service providers, including service provider server 130, through a platform, application, and/or application extension. User device 110 may detect when a user is involved in an event that causes a wait time, as well as if the wait time is causing a negative user experience with the event and wait. Service provider server 130 may determine content to output to the user via one or more web browsers, websites, and/or applications on user device 110 during the wait time.

User device 110, service provider server 130, and external data sources 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

User device 110 may be implemented using any appropriate hardware and software configured for wired and/or wireless communication with service provider server 130 and/or external data sources 150 for utilizing services and/or receiving automated content output during service use. User device 110 may correspond to an individual user, consumer, or merchant that utilizes a network and platform provided by service provider server 130 to access and use computing services. In various embodiments, user device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

User device 110 of FIG. 1 contains an application 120, monitoring components 112, a database 114, and a network interface component 118. Application 120 may correspond to executable processes, procedures, and/or applications with associated hardware. In other embodiments, user device 110 may include additional or different software as required.

Application 120 may correspond to one or more processes to execute modules and associated devices of user device 110 to provide a convenient interface to permit a user for user device 110 to enter, view, and/or process data including requesting of data processing, data loading, or other events with service providers (e.g., service provider server 130 or another service provider). In this regard, application 120 may correspond to specialized hardware and/or software utilized by user device 110 that may provide access to services, including electronic transaction processing for the items. Access and use of services may be provided through a user interface enabling the user to request data processing and/or other services provided by the service provider, including allowing a user to enter and/or view the items in a transaction. In various embodiments, application 120 may correspond to a general browser application configured to retrieve, present, and communicate information over the Internet (e.g., utilize resources on the World Wide Web) or a private network. For example, application 120 may provide a web browser, which may send and receive information over network 160, including retrieving website information, presenting the website information to the user, and/or communicating information to the website, including payment information for the transaction.

However, in other embodiments, application 120 may include a dedicated application of service provider server 130 or other entity (e.g., a merchant) resident on user device 110, which may be configured to assist in processing transactions electronically, such as a mobile application on a mobile device. Application 120 may include a data tracker used to track data for a user associated with user device 110 when the user interacts with different online platforms and entities, as well as real-world data of the user. The data tracker may correspond to an operation of application 120 and/or an application or browser extension, add-on, or plugin. These operations may include operations to monitor and track device data of device activities and interactions with other computing systems and online service providers. Further, application 120 may also monitor and track user data for activities and interactions with user device 110 and/or other physical components, including user movements, facial expressions, biometrics, eye movements, voice and voice patterns, and the like.

When utilizing services of different service providers, user device 110 and/or the user associated with user device 110 may experience a wait time. For example, during a data loading event (e.g., downloading/uploading data, installing or uninstalling data, performing a system update or recovery, requesting data retrieval or processing, etc.), user device 110 may arrive at a loading webpage, interface, or window. This may include a loading bar or wheel, a wait time calculator, and/or other wait time indicators. For example, this may be based on a transaction generated by application 120 on a merchant website. Application 120 may utilize a digital wallet associated with an account with service provider server 130 as a payment instrument, for example, through accessing a digital wallet or account of a user through entry of authentication credentials and/or by providing a data token that allows for processing using the account. Application 120 may also be used to receive a receipt or other information based on transaction processing. These events may take time, particularly when a high volume of processing calls, server, usage, and/or bandwidth is required.

Accordingly, application 120 may provide a window, interface, or other application field/element that allows for viewing of content automatically output and presented to the user. This content may be presented based on the detected device and/or user data that indicates a wait time. Further, service provider server 130 may determine that, during the wait time, the user is negatively impacted or having a bad experience with the corresponding service provider. This may be due to the data loading or service event, which requires remediation of the excess wasted time and usage of user device 110 during the event. As such, service provider server 130 may utilize one or more processes to determine that the user is having a negative user experience, and thereafter determine content to provide via the windows, interfaces, and/or fields of application 120. In some embodiments, data for the content may be streamed or otherwise provided to user device 110 by service provider server 130 and/or external data sources 150. However, in other embodiments, application 120 may output local data 116, such as local images, music, media content, documents, and the like User device 110 includes monitoring components 112, which may correspond to one or more hardware and/or software components of user device 110 used for monitoring user and/or device data. In this regard, monitoring components may include hardware components, such as a keyboard, mouse, touch screen, camera, microphone, biometric capture device, linked wearable device having one of the aforementioned components, and the like. Monitoring components 112 may further include associated software components, such as applications that may interface with these hardware components to utilize the components and record, track, or monitor data. Monitoring components 112 may further include network communication and/or data transfer monitoring components, such as components that may monitor network socket status and use for determining bottlenecking during data transfer and/or loading. Monitoring components 112 may further monitor data inputs and/or activity on the device, such as new inputs, changes to inputs, navigations between interfaces, applications, or websites, and the like. Monitoring components 112 may also monitor historical user activity during wait times, preferences and interests (e.g., browsing history, past purchased, viewed and consumed media data, social networking and/or messaging activity, etc.), and other information that may be relevant to content of interest to users. In this regard, application 120 may further utilize one or more of the hardware and/or software components of monitoring components 112 to track device and/or user data and provide to service provider server 130 for processing.

User device 110 may further include database 114 which may include, for example, identifiers such as operating system registry entries, cookies associated with application 120 and/or other applications, identifiers associated with hardware of user device 110, or other appropriate identifiers. Identifiers in database 114 may be used by a payment/service provider to associate user device 110 with a particular account maintained by the payment/service provider. Database 114 may also further store local data 116 for presentation to a user during an experienced wait time based on a data loading or processing event. In this regard, local data 116 may include locally stored data for one or more applications of user device 110, including images, music, media content, video games, documents, social networking or media data, microblogging data, transaction histories and other transaction data, and other types of data that an application may store locally for at least a limited amount of time (e.g., temporarily cached or stored data for use during wait times).

User device 110 includes at least one network interface component 118 adapted to communicate with service provider server 130 and/or external data sources 150 over network 160. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 130 may be maintained, for example, by an online service provider, which may provide operations for monitoring device and user data to automate content delivery during negative user experiences caused by wait times. Various embodiments of the content presentation system described herein may be provided by service provider server 130 and may be accessible by user device 110 when accessing a website or application provided by service provider server 130 or another service provider, merchant, or the like. In such embodiments, service provider server 130 may interface with user device 110 for monitoring device and user data through one or more components, network sockets, device or server signals, application data, and the like, which may include activities and/or interactions by the device and/or user. Service provider server 130 includes one or more processing applications which may be configured to interact with user device 110 and external data sources 150. In one example, service provider server 130 may be provided by PAYPAL®, Inc. of San Jose, Calif., USA. However, in other embodiments, service provider server 130 may be maintained by or include another type of service provider.

Service provider server 130 of FIG. 1 includes wait experience application 140, a service provider application 132, a database 134, and a network interface component 138. Wait experience application 140 and service provider application 132 may correspond to executable processes, procedures, and/or applications with associated hardware. In other embodiments, service provider server 130 may include additional or different modules having specialized hardware and/or software as required.

Wait experience application 140 may correspond to one or more processes to execute modules and associated specialized hardware of service provider server 130 to provide data, operations, and processes to monitor device and user data during active wait times and provide automated content output and/or presentation in response to negative user experiences during these wait times. In this regard, wait experience application 140 may correspond to specialized hardware and/or software used by a user associated with user device 110 to establish an account with wait experience application 140 and/or provide data linked to an account or identifier of a user or device. For example, an account provided by a browser plugin such as HONEY® may be provided. However, a more general account (e.g., a PAYPAL® account) may also provide the aforementioned account services. In some embodiments, no account of a user is required to be generated for providing the automated content delivery during wait times discussed herein. In such embodiments, general or local device content may be provided, or the user's preferences and past data may be generally linked to a user or device identifier.

In order to provide automated content output, wait experience application 140 may determine rules and/or train models to detect poor, bad, or other negative user experiences during wait times. For example, wait experience application 140 may initially establish one or more rules and a rule-based engine that define conditions and/or indicators of captured device and/or user data that are sufficient to exceed a threshold, score, or value indicating a negative user experience. These data processing rules may take data for captured device and/or user interactions and activity and execute such rules with the data to make a corresponding decision of whether content should be provided to the user. The rules may be based on automated analytics of the past device and/or user data, or may be established by a data scientist, administrator, internal or external end user, or the like based on business rules and decisions. In such embodiments, one or multiple factors may be required to be present to determine the user is having a negative experience. Such factors may include user movements, facial expressions, biometrics, eye movements, voice and voice patterns, and the like. Additionally, the factors may be associated with the user interacting with the device and/or the device interacting with another device or server, such as mouse or keyboard clicks and input, mouse focus changes, mouse movements, switching between applications or webpages, and the like.

In further embodiments, wait experience application 140 may utilize one or more ML or other AI models trained to make user experience classifications based on input attributes for the user and/or device data in training data sets. When building ML models, the training data may be used to generate one or more classifiers and provide recommendations, predictions, or other outputs based on those classifications and an AI model. For example, ML models may include one or more layers, including an input layer, a hidden layer, and an output layer having one or more nodes, however, different layers may also be utilized. For example, as many hidden layers as necessary or appropriate may be utilized. Each node within a layer is connected to a node within an adjacent layer, where a set of input values may be used to generate one or more output values or classifications. Within the input layer, each node may correspond to a distinct attribute or input data type that is used to train ML models.

Thereafter, the hidden layer may be trained with these attributes and corresponding weights using an AI algorithm, computation, and/or technique. For example, each of the nodes in the hidden layer generates a representation, which may include a mathematical AI computation (or algorithm) that produces a value based on the input values of the input nodes. The AI algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for ML models that attempt to classify the user experience. Thus, when ML models are used to perform a predictive analysis and output, the input may provide a corresponding output based on the classifications trained for ML models.

Thus, ML models may be trained by using training data described herein. By providing training data to train ML models, the nodes in the hidden layer may be trained (adjusted) such that an optimal output (e.g., a classification) is produced in the output layer based on the training data. By continuously providing different sets of training data and penalizing ML models when the output of ML models is incorrect, ML models (and specifically, the representations of the nodes in the hidden layer) may be trained (adjusted) to improve its performance in data classification. Adjusting ML models may include adjusting the weights associated with each node in the hidden layer. The training data may be used as input/output data sets that allow for ML models to make classifications based on input attributes. The initial training data may include annotated or unannotated data correspond to device and/or user data (e.g., activities, interactions, etc.) during wait times. With annotated data, the data may further be annotated with classifications, such as positive, neutral, and/or negative user experiences. Output classifications for an ML model may be classifications of device and/or user data as having these user experiences to determine whether to automatically present content during a wait time. The data processing rules for the rule-based engine and/or ML model may correspond to experience data 146 that is then later used with a monitoring operation 142 and user responses 144 to make determinations of whether to output and/or present wait presentation data 148 on user device 110 or other devices and/or webpages during wait times.

Thus, monitoring operation 142 of wait experience application 140 may detect and/or through an application, application plugin, socket activity, or webpage activity, if a data loading event is occurring, such as uploading/downloading of data, processing data, and the like. For example, an event associated with data loading through an application or website may occur when a user is performing one of these data processing events, an interface or webpage is experiencing a load time, a data processing operation is completing, and/or where interface elements (e.g., a timer, loading wheel or bar, or another interface element) is displayed. Further, wait experience application may also use recent historical data of load times to determine that a webpage or application is experiencing increased or long wait times. The user may also be detected as experiencing an event having a wait time through a real-world environment and/or in-person data, such as a checkout line, wait line for transportation, and the like. Thus, user movement (or lack thereof, such as when standing or sitting) or other user data may also indicate when a user is waiting.

When a wait time is detected, monitoring operation 142 may further monitor data device and/or user activities and/or interactions. This may include video, audio, audiovisual content, biometrics, movements, and the other activity of the user. In this regard, wait experience application 140 may determine user responses 144 to the wait time, which may include breathing patterns, heart rate, eye movements and/or eye focus on a screen, hand or finger movements, leg or foot movements, and the like. User responses may further include network socket activity, mouse or keyboard clicks and input, mouse focus changes, mouse movements, switching between applications or webpages or other navigations, and the like. User responses 144 may also include more generally if the user moves, leaves, and/or periodically checks on user device 110 during the wait time for the data loading or other event. In such embodiments, if the user is not present or only periodically present for short amounts of time, content may not be displayed to the user as they will not be experiencing much if any wait times while engaged with user device 110.

However, if, using user responses 144 and experience data 146, the user is determined to be having a negative user experience, wait experience application 140 may output wait presentation data 148 to user device 110 over one or more channels. Wait presentation data 148 may include content data to present to the user during the wait time or may include instructions to output local data 116 and/or additional wait data 152 on user device 110. Output of wait presentation data 148 may occur through one or more communication channels, applications, and/or software components. For example, a web browser plugin, add-on, or extension may allow for output and/or presentation of wait presentation data 148, such as through a window, field, or other interface and/or interface element of a web browser and/or webpage. A web or software application may also provide output of wait presentation data 148, for example, through API calls, requests, and responses based on API integrations. Additionally, signal exchange and signaling with a data source during data loading may also be used to detect device and/or user data, as well as request data output. These systems and architectures are described in more detail with regard to FIGS. 2A-3B.

Wait presentation data 148 may correspond to a particular type of data to output to a user. When determining content to present to a user during a wait time, wait experience application 140 may determine a user profile and/or user preference for content output. For example, past experience data 136 may include a user account or user identifier linked to the user associated with user device 110, which may include previous data output to a user, interests of the user, content preferences and interests, and the like. For example, past experience data 136 may include preferences for news stories, sports, local news/sports of interest, movies and/or television shows, music, other media content, social networking, image sharing, video games (e.g., either online games or local game applications), and the like. Past experience data 136 may include data sources of interest to a user, such as one or more of external data sources 150, including a demographic of the user, a social networking or media account, a browser history, online posts or microblogging account, and the like.

A location of the user may also be used to find nearby or local servers within a connection proximity to more quickly serve data to a user. Further, the data for wait presentation data 148 may include static or previously output (e.g., imaged) data, which may not require data processing to provide. However, if such data is unavailable or preferences of a user for content is unavailable or unknown, wait presentation data 148 may include local data 116 and/or other generic data (e.g., current or breaking news, new movie or television advertisements or trailers, generic web-based video games, etc.). Wait experience application 140 may statically output data within and application or webpage interface, such as by displaying a news article or media content. This may be displayed over or in order to hide data associated with the event causing the data loading or other wait time. Further, other data may be displayed dynamically (e.g., a slideshow of images) where the display does not adversely affect data loading, or the wait time based on bandwidth consumption. Thereafter, when the wait time is detected as expiring, wait experience application 140 may query or prompt the user that the event has ended and whether to return to the original application or webpage. In other embodiments, the content may be immediately removed, and/or the user may be provided further access to the displayed content.

Further, it is understood that one or more of the operations discussed herein of wait experience application 140 may instead be provided by another device or service including user device 110 and/or a device or server of a merchant or another service provider.

Service provider application 132 may correspond to one or more processes to execute modules and associated specialized hardware of service provider server 130 to process a transaction and/or provide another service to end users of service provider server 130, which may include processes that require wait times. In some embodiments, service provider application 132 may correspond to specialized hardware and/or software used by a user associated with user device 110 to establish a payment account and/or digital wallet, which may be used to generate and provide user data for the user, as well as process transactions. In various embodiments, financial information may be stored to the account, such as account/card numbers and information. A digital token for the account/wallet may be used to send and process payments, for example, through an interface provided by service provider server 130. The payment account may be accessed and/or used through a browser application and/or dedicated payment application executed by user device 110 and engage in transaction processing through service provider application 132. Service provider application 132 may process the payment and may provide a transaction history to user device 110 for transaction authorization, approval, or denial. However, in other embodiments, service provider application 132 may instead provide different computing services, including social networking, microblogging, media sharing, media content streaming, messaging, video game, business and consumer platforms, etc. Thus, the operations provided by service provider application 132 may incur different, unexpected, increased, or long wait times that adversely affect user experiences, which may be remedied using wait experience application 140 and the additional devices and components described herein.

Additionally, service provider server 130 includes database 134. Database 134 may store various identifiers associated with user device 110. Database 134 may also store account data, including payment instruments and authentication credentials, as well as transaction processing histories and data for processed transactions. Database 134 may store received data associated with a user for use in determining content to automatically output to users during wait times. For example, database 134 may store past experience data 136, which may include past user activities and/or interactions during wait times, as well as preferences and/or a user profile for automated content deliveries.

In various embodiments, service provider server 130 includes at least one network interface component 138 adapted to communicate user device 110, external data sources 150, and/or another device/server over network 160. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

External data sources 150 may correspond to an external platform, server, and/or device separate from service provider server 130 that may provide some data to service provider server 130, for example, during automated content delivery. External data sources 150 may provide merchant and/or item data for offers associated with items/services that may be purchased by users. In various embodiments, service provider server 130 may interface with external data sources 150 via one or more APIs of services or applications of service provider server 130 and external data sources 150, which allows for data exchange. This may include platforms and APIs for social networking, microblogging, media sharing, media content streaming, messaging, video game, business and consumer platforms, and the like. In this regard, external data sources 150 may provide additional wait data 152 to user device 110 and/or service provider server 130 during automated content output and presentation for a wait time or period on user device 110.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2A:
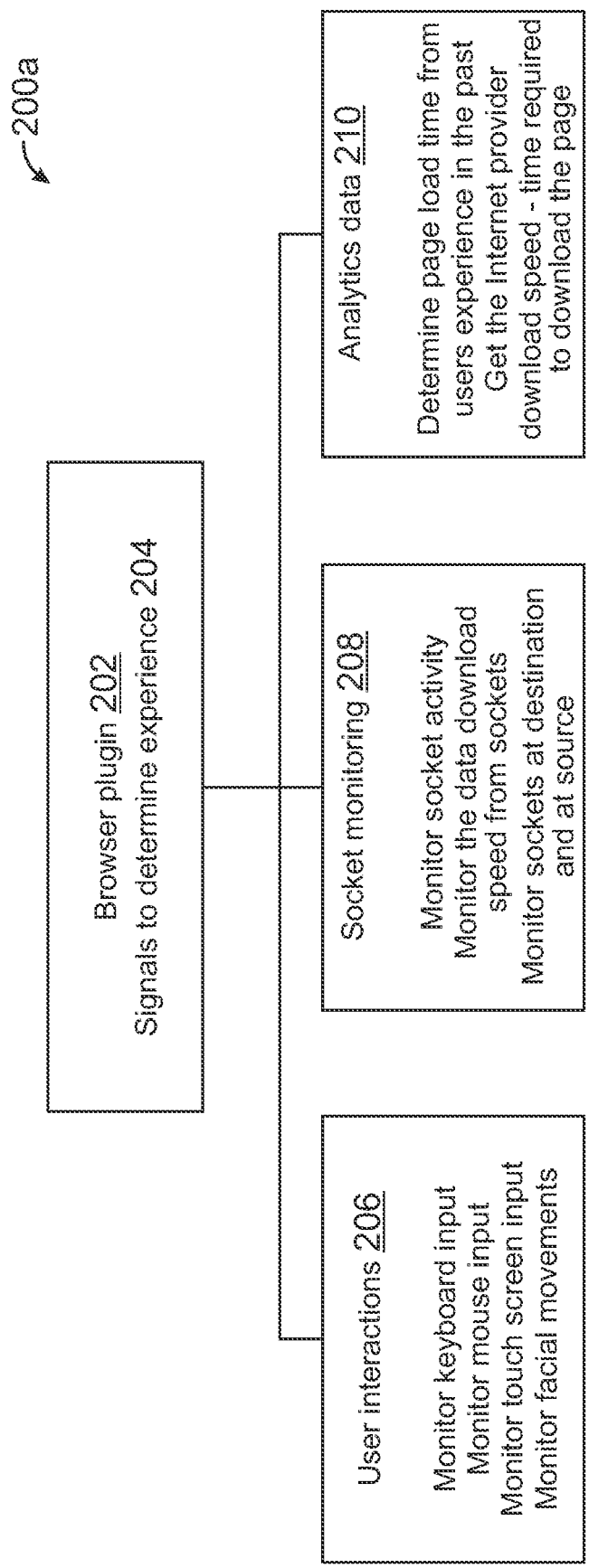
FIG. 2A is an exemplary system architecture for a browser plugin that provides automated content delivery during detected wait times, according to an embodiment.

FIG. 2A is an exemplary system architecture 200a for a browser plugin that provides automated content delivery during detected wait times, according to an embodiment. System architecture 200a includes a browser plugin 202 that may interact through user device 110 discussed in reference to system 100 of FIG. 1. System architecture 200a may correspond to a system for providing automated content delivery and presentation during detected wait times, such as those caused by data loading on user device 110 in system 100.

In system architecture 200a, browser plugin 202 may function to monitor data for a user. For example, signals to determine experience 204 may include those computing device signals that identify a user experience during a wait time, such as if the user is negatively reacting to the wait time and/or is upset with the service provider causing the wait time (e.g., during a data loading event). For example, signals to determine experience 204 may include those signals captured by browser plugin 202 during a user's interaction with a website via a web browser. Browser plugin 202 may also be capable of capturing additional on-device data and signals, such as device inputs. Moreover, browser plugin 202 may also capture device activity and interaction with external servers, including network socket activity, as well as data that may be accessed and/or requested from an Internet service provider (ISP) and/or on a LAN or WAN.

In this regard, signals to determine experience 204 that are detected by browser plugin 202 may include user interactions 206, socket monitoring 208, and analytics data 210. Monitoring user interactions 206 may include monitoring keyboard input, mouse input, touch screen inputs, and facial movements. With different devices, additional device inputs and/or user bodily features may also be captured. For example, additional devices may include video game controllers, haptic feedback devices, vehicle console devices, microphones and other voice capture devices, cameras including infrared cameras, and the like. When monitoring user interactions 206, the user's input and motions may be indicative of a negative customer experience. For example, quickly moving the mouse, mashing different keyboard keys, rapidly pressing on a touch screen, yelling or cursing, or angry/upset facial features may all indicate a negative user experience with the wait time. In further embodiments, navigating away from a wait page or interface with certain facial features (e.g., eye rolling, furrowed brow, etc.) may also indicate a negative experience. Thus, in some embodiments, a combination of user interactions 206 may be required. However, in absence of the features, or with other features indicating contentedness may be sufficient to determine the user is not reacting negatively to the wait time.

With socket monitoring 208 and analytics data 210, browser plugin 202 may instead monitor and/or retrieve data for network activity and/or interactions. For example, socket monitoring 208 may include monitoring socket activity (e.g., network sockets connected to an endpoint, such as a server, and data transferred on a communication pathway), monitoring the data download speed from the sockets, as well as monitoring sockets at both the destination and the source. By monitoring sockets and their activity, the service provider associated with browser plugin 202 may determine where the bottleneck is during data loading, as well as how long a wait time may be during data loading, to determine whether to monitor the user during the wait time and/or deliver automated content to the user's device. With analytics data 210, browser plugin 202 may retrieve and/or monitor data on the network for the corresponding device, such as by determining a page load time from the user's experience in the past, and getting the ISP's download speed, such as a time required to download the page, from the ISP. This data may include analytics that may be used to determine if a data loading event requires a wait time, and how long the wait time is, to determine whether to monitor the user and/or deliver automated content.

Figure 2B:
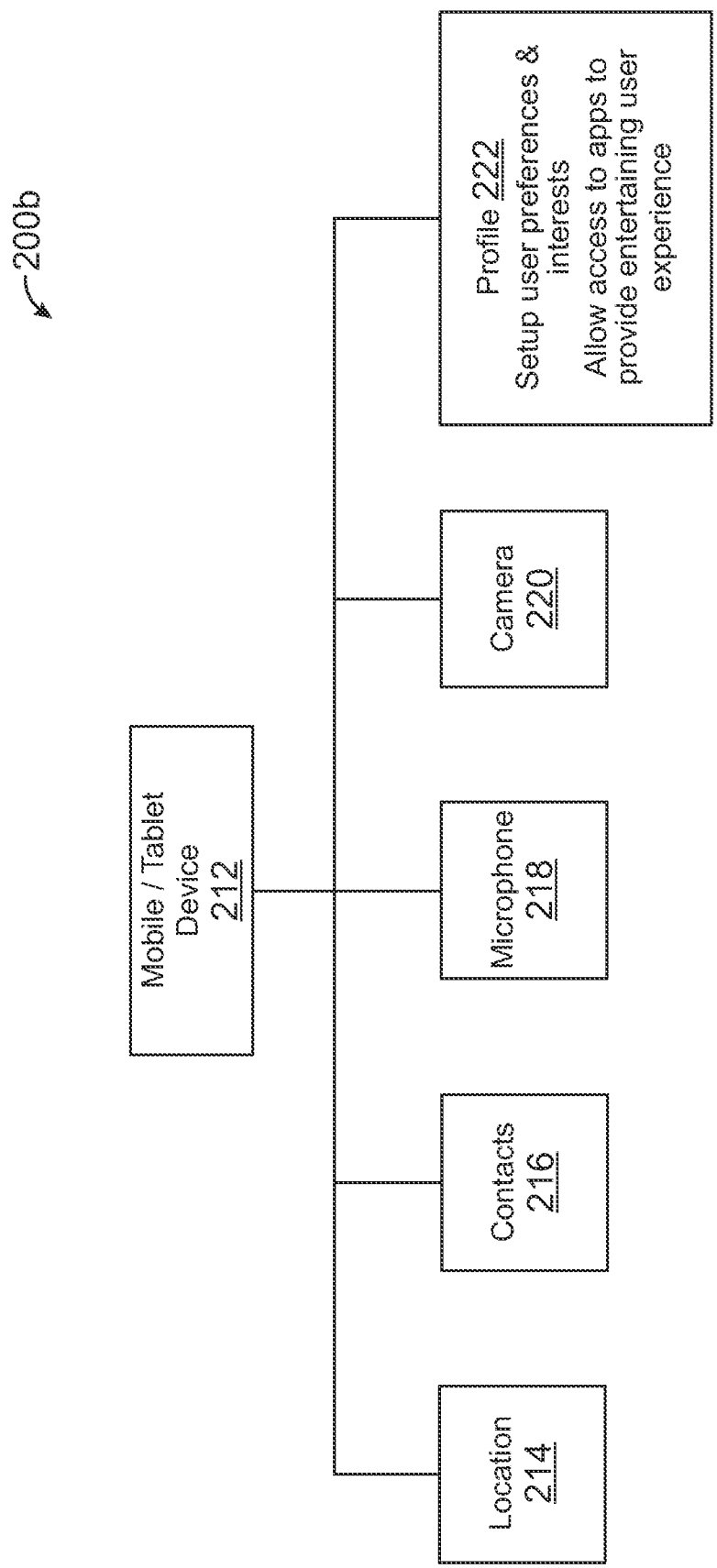
FIG. 2B is an exemplary system architecture for a mobile or tablet device that provides automated content delivery during detected wait times, according to an embodiment.

FIG. 2B is an exemplary system architecture 200b for a mobile or tablet device that provides automated content delivery during detected wait times, according to an embodiment. System architecture 200b includes a mobile/tablet device 212 that may correspond to user device 110 discussed in reference to system 100 of FIG. 1. System architecture 200b may correspond to a system for providing automated content delivery and presentation during detected wait times, such as those caused by data loading on user device 110 in system 100.

In system architecture 200b, mobile/tablet device 212 may function to monitor data for a user. For example, mobile/tablet device 212 may include a mobile or resident software application, or may access a rich Internet application, which may function to control the automated content delivery on mobile/tablet device 212. In this regard, the application on mobile/tablet device 212 may have access to and/or include operations to access a location 214, contacts 216, a microphone 218, and a camera 220. In order to access this data and/or components, mobile/tablet device 212 may setup a profile 222 that allows a user to define certain data used for automated content delivery. For example, profile 222 allows a user to setup user preferences and interests in media content and/or data for delivery during a detected wait time. Further, profile 222 allows for defining access and/or permission to access applications (including components utilized by applications, such as microphone 218 and camera 220). The access and permissions allow for collecting data to determine when to automate content delivery during a wait time.

For example, based on profile 222, mobile/tablet device 212 may determine a location 214, such as through a geo-location detection component of mobile/tablet devices 212. Location 214 may allow mobile/tablet device 212 and the corresponding service provider to determine what nearby servers may be available for retrieving data, as well as local or nearby news, sporting events, and the like. Contacts 216 may be accessed to allow a user, during a wait time, to view social networking or microblogging content, as well as potentially communicating with such contacts. Microphone 218 and camera 220 may be used to capture user data, such as their speech and/or facial/body movements during the wait time. Based on such speech and/or ambient noise (e.g., rocking in a chair, typing on a keyboard, shuffling through papers, etc.), a user experience of a user may be determined.

Figure 3A:
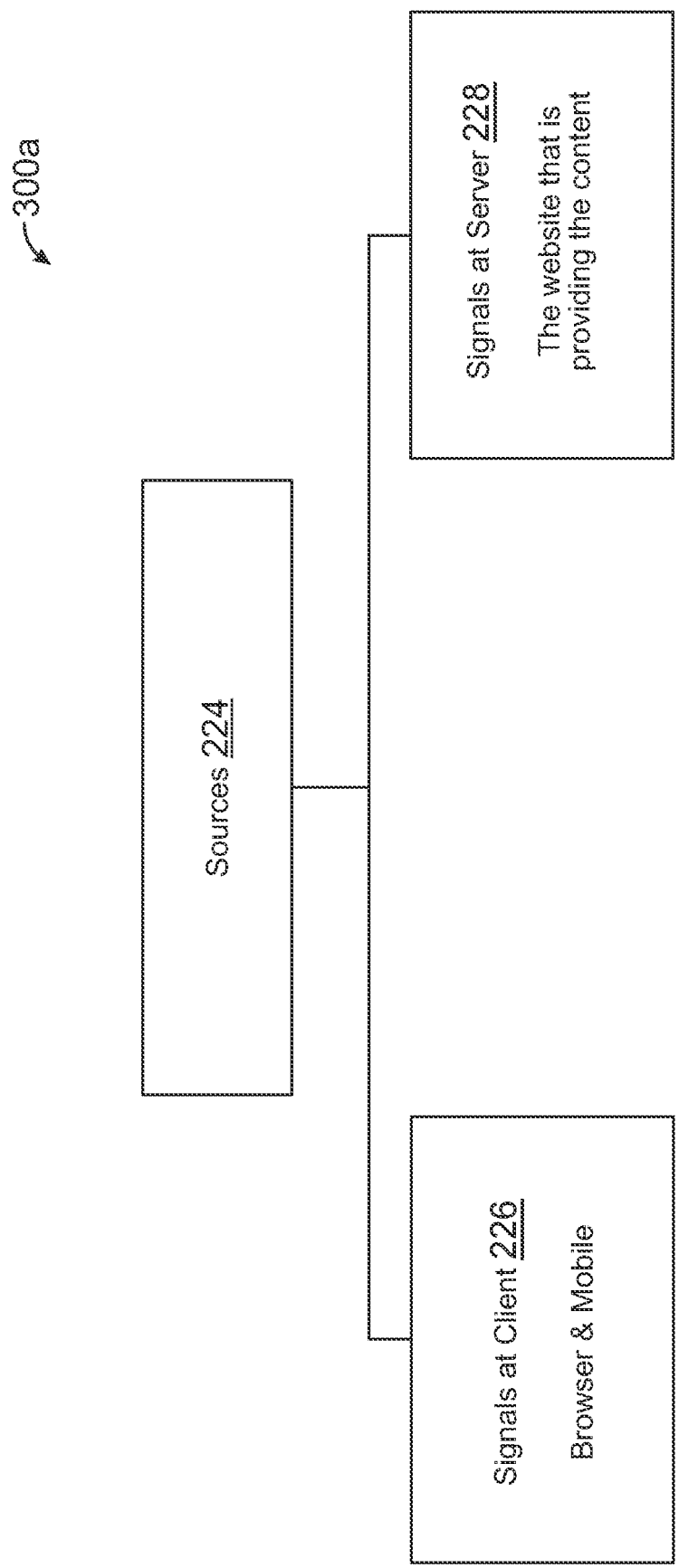
FIG. 3A is an exemplary system architecture for signal detection for automated content delivery, according to an embodiment.

FIG. 3A is an exemplary system architecture 300a for signal detection for automated content delivery, according to an embodiment. System architecture 300a includes sources 224 that may interact with signals at client 226, such as through user device 110 discussed in reference to system 100 of FIG. 1. Sources 224 may further interact with signals at server 228, which may correspond to a server of a service provider including service provider server 130 and/or external data sources 150 discussed in reference to system 100 of FIG. 1. Thus, system architecture 300a may correspond to a system for providing automated content delivery and presentation during detected wait times, such as those caused by data loading on user device 110 in system 100.

In system architecture 300a, sources 224 may correspond to various online data sources that may provide data processing, content delivery, and other data services to users. In this regard, sources 224 may encounter wait times, such as during streaming, data processing, uploading/downloading data, and other data loading events, which may be caused by bandwidth consumption, latency, lag, server errors or outages, and the like. In order to detect these wait times, and thereafter determine if a user is having a negative user experience, a service provider may monitor signals at client 226 and signals at server 228 from sources 224.

For example, the service provider may provide or integrate with a platform for sources 224 in order to monitor network signals. These network signals may include those coming from a browser and/or mobile device receiving content, and a server for a website that is providing the content. Signals from client 226 may include both network activity signals (e.g., download speed, network socket activity, etc.), as well as signals regarding device or user activity and/or interactions. Similarly, signals at server 228 may include network activity of the server, which may also include estimated download times, resource availability, server status, past download speed (which may be limited to a certain recency, such as last hour, 5 minutes, 30 minutes, etc.), and other data that may indicate server and/or network health or functionality. Signals at server 228 may further include interactions by the device corresponding to signals at client 226. Such signals may then be used as discussed herein to provide automated content delivery.

Figure 3B:
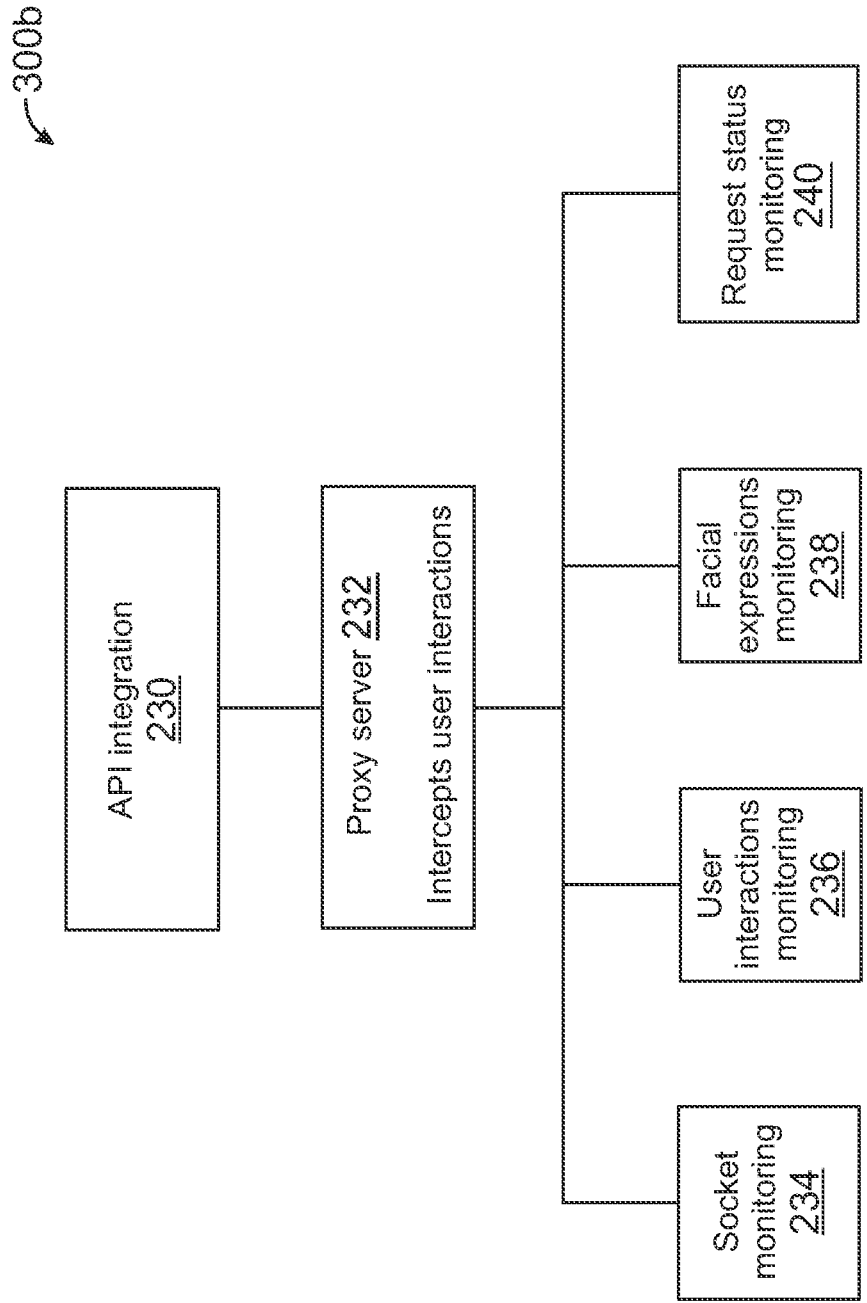
FIG. 3B is an exemplary system architecture for an API integration for providing automated content delivery during detected wait times, according to an embodiment.

FIG. 3B is an exemplary system architecture 300b for an API integration for providing automated content delivery during detected wait times, according to an embodiment. System architecture 300b includes an API integration 230 with a proxy server 232 that may be utilized by service provider server 130 discussed in reference to system 100 of FIG. 1 in order to provide automated content delivery and presentation during detected wait times. Therefore, system architecture 300b may be used to provide content delivery automatically during data loading on user device 110 in system 100.

API integration 230 may correspond to an integration by a service and/or system of service provider server 130 with proxy server 232 in order to exchange API calls and data. Proxy server 232 may correspond to a server in communication with a computing device, such as user device 110, during data transfers. For example, proxy server 232 may act as a proxy between user device 110 and a data source or service provider that serves content and/or data processing services to user device 110. In this regard, using API integration 230 with proxy server 232, service provider server 130 may be able to perform various monitoring and automated content delivery on user device 110.

For example, API integration 230 with proxy server 232 allows for socket monitoring 234, user interactions monitoring 236, facial expression monitoring 238, and request status monitoring 240. Socket monitoring 234 may include monitoring network sockets to determine data transmissions and data transmission speeds, which may be utilized to determine wait times during data loading. User interactions monitoring 236 may include those user interactions with their device (e.g., inputs and other capturable data), as well as real-world interactions with other objects that may be captured by microphone, cameras, and the like. In this regard, facial expressions monitoring 238 may include data that similarly may be captured by a camera or other optical capture device, such as if the user is smiling, frowning, or has another facial expression indicating a positive, neutral, or negative user experience. Additionally, request status monitoring 240 may monitor requests for other data, such as navigations, page display requests, and the like. This data may then be used to determine a user's experience during a wait time by service provider server 130 through API integration 230, and then output content to the user.

Figure 4:
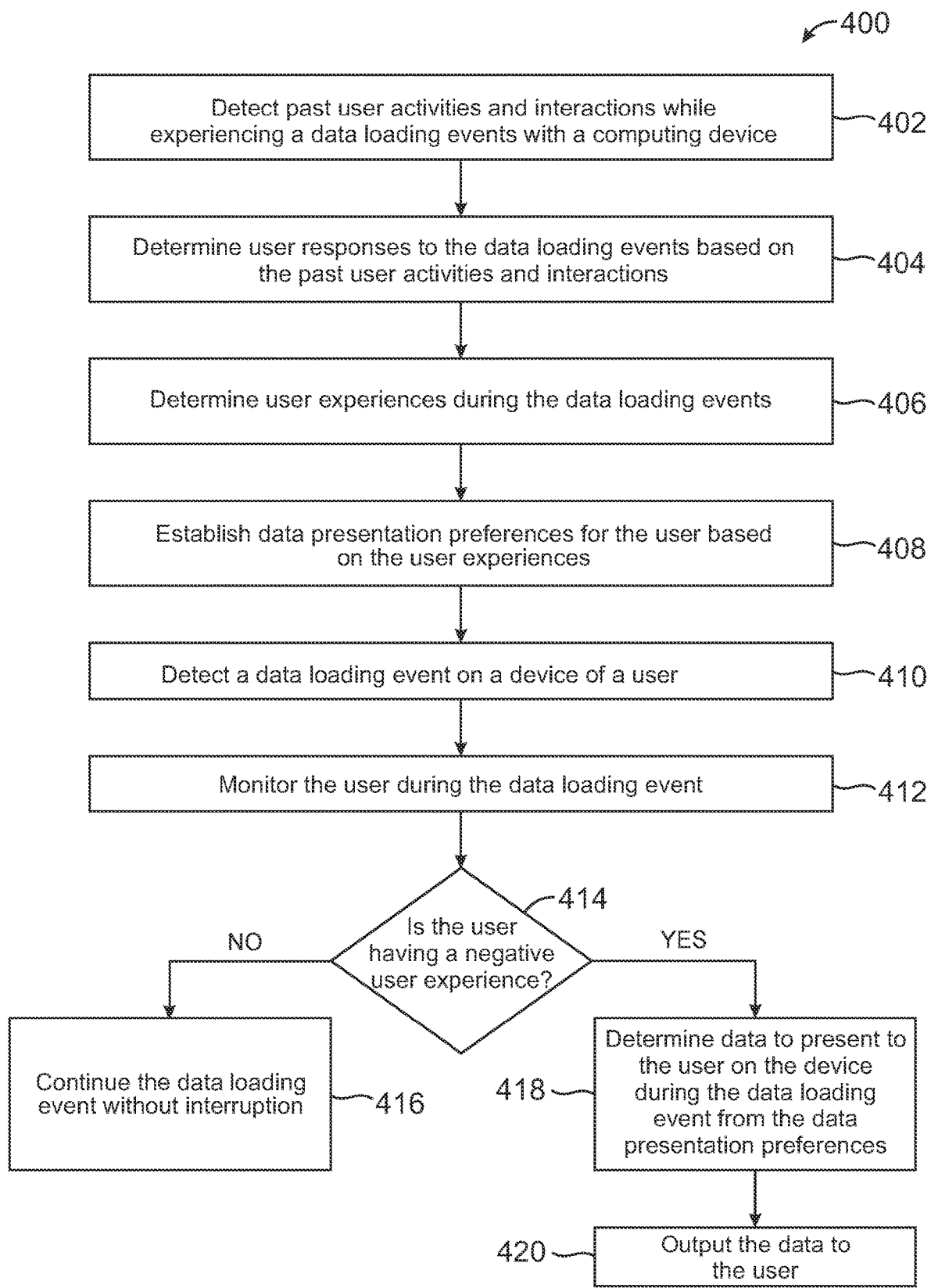
FIG. 4 is a flowchart for automated presentation of entertaining content during detected wait times, according to an embodiment.

FIG. 4 is a flowchart 400 for automated presentation of entertaining content during detected wait times, according to an embodiment. Note that one or more steps, processes, and methods described herein of flowchart 400 may be omitted, performed in a different sequence, or combined as desired or appropriate.

At step 402 of flowchart 400, past user activities and interactions of a user while experiencing data loading events with a computing device are detected. These activities and interactions may include both device and/or user data, such as real-world data of a user (e.g., image, video, audio, audiovisual content, biometrics, movements, and the other activity), as well as virtual data on a device (e.g., socket layer activity, mouse or keyboard clicks and input, mouse focus changes, mouse movements, switching between applications or webpages, and the like). A data loading event may occur when some computing activity or operation is causing a wait time, such as while downloading or uploading data, installing or uninstalling data, performing a system update or recovery, requesting data retrieval or processing, and the like. In further embodiments, other types of events that cause wait times may also be monitored, including real-world events that cause wait times.

At step 404, user responses to the data loading events are determined based on the past user activities and interactions. These user responses may correspond to behavior of a user including breathing patterns, heart rate, eye movements and/or eye focus on a screen, hand or finger movements, leg or foot movements including tapping, vocal expressions, and the like. This behavior may indicate whether the user is happy, satisfied, neutral, annoyed or irritated, sad, or angry during the wait time. Thus, the user responses may indicate a user's experience during the event and wait time, as well as their experience with a corresponding service provider. At step 406, user experiences are then determined during the data loading events. These user experiences may correspond to whether the user is having a positive, neutral, or negative experience while utilizing the service provider for the event and/or during the wait time. In order to determine these experiences, rules for a rule-based engine may be generated and/or updated, where user responses are utilized to indicate a particular experience based on the rules. In further embodiments, attributes for the rules may be used to train one or more ML models for classification and/or prediction of particular experiences. Thus, the models may predictively analyze additional user responses to classify the responses to a corresponding experience.

At step 408, data presentation preferences for the user are established based on the user experiences. The data presentation preferences may correspond to a user profile, account, or data structure that may include preferences, interests, past viewing or browsing histories, transaction histories, and the like that may indicate content that a user would like to view. The content may include an image, a music file, audiovisual content, or game data, as well as other online content including news or sports stories, social networking posts and content, media or image sharing, microblogging, and the like. However, if a user is new, unknown, or does not opt-in to data sharing, the preference may be more general, based on a location or demographic, based on the current service provider (e.g., services and other operations and information provided by the service provider). Based on this data, at step 410, a data loading event is detected on a device of a user. This may be detected based on monitoring application or browser data or other on device or website data. Further signaling between data sources and downstream signaling devices (e.g., computing devices and servers) and/or through API integrations with web and native applications.

At step 412, the user is monitored during the data loading event. The user may be monitored through device components of the user's device, as well as local devices and/or components nearby the user (e.g., a connected web camera, in-store devices and/or cameras at a retail or merchant location, wearable computing devices, etc.). The monitored data may include device and/or user activities and interactions while experiencing the wait for the data loading event. Using the rule-based engine and/or trained ML models, at step 414, it is determined if a user is having a negative user experience. For example, the body language, facial expressions, voice, eye movements, biometrics, leg/foot movements, and the like may indicate if a user is relaxed, engaged, annoyed, or mad. Similarly, the device's data, such as mouse and keyboard inputs, mouse movements, navigations, opening/closing of applications, messaging, and the like may also indicate similar sentiments and user experiences.

If the user is having a positive experience (or at least not a negative experience and/or is not present), at step 414, the data loading event is continued without interruption. In this regard, the user may not want to view additional content, may not be present, or may be viewing preferred content. However, if the user is detected as having a negative user experience, at step 418, data to present to the user on the device during the data loading event is determined from the data presentation preferences. The data may be fetched and/or requested to be presented (e.g., based on locally stored device data) based on interests and/or preferences in a user profile of the user. Further, the data may be fetched from one or more external resources, including using an out-of-band or different communication channel or pathway to prevent slowing of data loading. To fetch data quickly, local or nearby servers within a proximity distance of the user's device may be used to more quickly serve data.

At step 420, the data is output to the user on the user's device. This may include displaying the data in a frame, window, interface element, or the like. The data may be directly output in a web browser, application, or webpage using a browser extension, application and user interfaces, and/or API integration and calls to present the data. Thereafter, when the data loading event completes, the user may be prompted of whether to remove the presented content and data, as well as whether the user would like further access to the data (e.g., a web link, email with information, etc.). In other embodiments, the content may be immediately removed, and the data may be stopped from streaming or other output.

Figure 5:
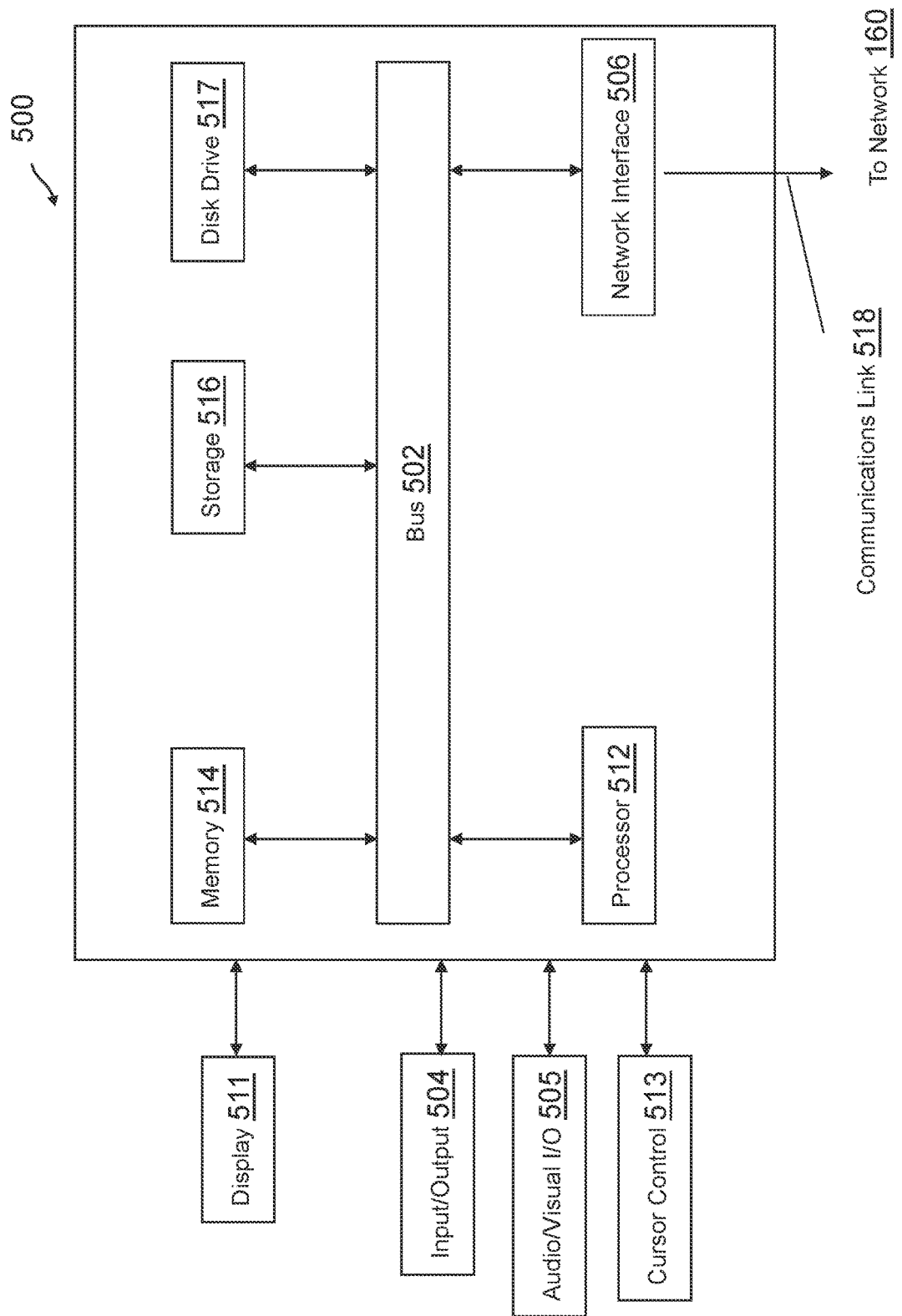
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, images, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. For example, while the description focuses on gift cards, other types of funding sources that can be used to fund a transaction and provide additional value for their purchase are also within the scope of various embodiments of the invention. Thus, the present disclosure is limited only by the claims.

What is claimed is:

1. A computing device system comprising:
a non-transitory memory; and
one or more hardware processors coupled to the non-transitory memory and configured to read instructions from the non-transitory memory to cause the computing device system to perform operations comprising:

determining that an application executing on the computing device system is loading first data for an operation of the application;

monitoring application activity during the loading;

determining analytics data for a wait time associated with the loading;

capturing, based on the application activity and the analytics data, user data of an activity performed by a user utilizing the computing device system during the loading;

classifying, using an artificial intelligence (AI) system, user attributes captured during the loading from the user data as one of a positive user experience or a negative user experience;

determining, based on the classified user attributes, a user response to the loading of the first data during the wait time;

executing an application programming interface (API) call for second data to output to the user during the wait time based on the user response;

receiving the second data; and outputting the second data on the computing device system during the wait time.

2. The computing device system of claim 1, wherein the application comprises a web browser application, and wherein the application activity is monitored on the computing device system via a web browser plugin for the web browser application.

3. The computing device system of claim 1, wherein the API call comprises an asynchronous API call performed in a different communication channel from that of the computing device system used for loading the first data for the application.

4. The computing device system of claim 1, wherein the second data comprises information associated with a computing service provided by a service provider associated with one of the application or the first data, and wherein prior to executing the API call, the operations further comprise:

determining the computing service recommended to the user based on historical application usage data by the user with the application.

5. The computing device system of claim 4, wherein the historical application usage data comprises data for a profile of the user with an account provided to the user by the service provider.

6. The computing device system of claim 1, wherein the second data comprises local device data stored by the computing device system, and wherein the local device data comprises one of an image, a music file, audiovisual content, or game data.

7. The computing device system of claim 1, wherein the second data comprises news data for a location associated with the computing device system, and wherein the API call is executed with a local server at or associated with the location.

8. The computing device system of claim 1, wherein the operations further comprise:

prompting, on the computing device system prior to the outputting the second data, the user of whether to output the second data during the loading.

9. The computing device system of claim 1, wherein the monitoring the application activity comprises monitoring a network socket for a communication link between the application on the computing device system and a network application executing on a networked server.

10. The computing device system of claim 1, wherein the determining that the application is loading the first data comprises detecting one of a website navigation to a website, receiving a checkout request for a digital checkout on the website, or receiving a request to download the first data in the application.

11. The computing device system of claim 1, wherein the second data is specific to a uniform resource indicator (URI) or a uniform resource locator (URL) for a website accessed by the computing device system via the application.

12. A method comprising:

detecting that a webpage is loading first webpage data for the webpage from a computing device of a user;

monitoring user activity of the user via at least one of the webpage or the computing device while the webpage is loading the first webpage data;

classifying, using an artificial intelligence (AI) system, user attributes captured while the webpage is loading the first webpage data from the user activity as one of positive or negative;

determining a user experience of the user with the webpage while loading the first webpage data based at least on the classified user attributes;

determining a user response to the webpage loading the first webpage data based on the classified user attributes and the user experience;

determining, based on the user response, a preference of the user for wait time data presented to the user while the webpage is loading the first webpage data;

retrieving the wait time data from at least one data source; and presenting, within a webpage frame of the webpage, the wait time data to the user during loading of the first webpage data.

13. The method of claim 12, further comprising:

requesting, prior to the monitoring the user activity, a permission to monitor the user activity from the user via the computing device;

receiving the permission to monitor the user activity from the computing device; and activating at least one device component of the computing device based on receiving the permission.

14. The method of claim 13, wherein the at least one device component comprises a geolocation detection module, a microphone, a camera, a touch screen interface, a keyboard, or a mouse.

15. The method of claim 12, wherein the user activity comprises a facial expression of the user during the loading, and wherein the determining the user experience comprises comparing the facial expression to one or more past facial expressions of at least one of the user or an additional user.

16. The method of claim 15, wherein the additional user is selected based on at least one of a demographic of the user, a location associated with the user, an age group of the user, or contacts of the user.

17. The method of claim 12, wherein prior to the monitoring the user activity, the method further comprises:

determining a webpage load time for the first webpage data based on past user experiences with the webpage; and determining that the webpage load time exceeds a threshold load time, wherein the monitoring is performed in response to the determining that the webpage load time exceeds the threshold load time.

18. The method of claim 12, wherein the wait time data comprises second webpage data for one of the webpage or an additional webpage selected by the user in the preference of the user for the wait time data.

19. A non-transitory machine-readable medium having stored thereon machine-readable instructions executable to cause a machine to perform operations comprising:
monitoring, on a device of a user, user interactions with an application while the application is loading data for one or more computing operations of the application, wherein the user interactions comprise user activities of the user with the application and in a real-world environment;
classifying, using an artificial intelligence (AI) system, user attributes captured while the webpage is loading the data from the user interactions as one of positive or negative;
determining user responses during the loading based on the classified user attributes;
determining a user wait experience with the application during the loading based on at least one of the user responses;
requesting a user preference for additional data to output to the user based on detecting the user wait experience during a subsequent data loading event; and
establishing the user preference with the at least one of the user responses for presentation of the additional data during the loading the data for the one or more computing operations.

20. The non-transitory machine-readable medium of claim 19, wherein the operations further comprise:
monitoring the user during the subsequent data loading event;
determining, based on the monitoring, that the user is having the user wait experience based on the at least one of the user responses; and
outputting the additional data to the user based on the user preference.

* * * * *